(12) United States Patent
Fleischmann

(10) Patent No.: US 6,203,180 B1
(45) Date of Patent: Mar. 20, 2001

(54) AEROPLANE CABIN LIGHTING ARRANGEMENT

(75) Inventor: Walter Fleischmann, Allersberg (DE)

(73) Assignee: Diehl Striftung & Co., Nüberg (DE)

( * ) Notice: Subject to any disclaimer, the term of this patent is extended or adjusted under 35 U.S.C. 154(b) by 0 days.

(21) Appl. No.: 09/372,302

(22) Filed: Aug. 11, 1999

(30) Foreign Application Priority Data

Sep. 22, 1998 (DE) .............................................. 198 43 330

(51) Int. Cl.$^7$ .............................. B64D 47/02; B64F 1/20; F21V 1/20
(52) U.S. Cl. ........................... 362/471; 362/479; 362/490; 362/488; 362/147; 362/545; 362/470; 362/219; 362/800
(58) Field of Search ..................................... 362/471, 479, 362/478, 800, 147, 219, 490, 488, 545, 483, 470

(56) References Cited

U.S. PATENT DOCUMENTS

| | | | |
|---|---|---|---|
| 4,158,223 | 6/1979 | Walley et al. | 362/297 |
| 4,794,373 | * 12/1988 | Harrison | 340/286 |
| 5,661,374 | * 8/1997 | Cassidy | 315/307 |
| 5,803,579 | * 9/1998 | Turnbull | 362/83.1 |

* cited by examiner

Primary Examiner—Sandra O'Shea
Assistant Examiner—Ali Alavi
(74) Attorney, Agent, or Firm—Scully, Scott, Murphy & Presser

(57) ABSTRACT

Proposed is a lighting arrangement which is mounted at or in the ceiling (4) preferably of an aeroplane cabin (2), comprising a plurality of punctiform light sources (8), wherein the punctiform light sources (8) have at least one light emitting diode (LED) (9) and are at least partially connected together in parallel or in series and are connected to at least one power supply unit (14). A Zener diode (15) is connected in parallel in the reverse direction in relation to each light emitting diode or light emitting diode group. The power supply unit (14) is such that it provides for a constant current flow. The light emitting diodes used are preferably white light emitting diodes.

8 Claims, 1 Drawing Sheet

AEROPLANE CABIN LIGHTING ARRANGEMENT

BACKGROUND OF THE INVENTION

1. Field of the Invention

The invention concerns a lighting arrangement which is mounted on or in the ceiling of a vehicle in particular a cabin lighting arrangement which is mounted in an aeroplane cabin.

Aeroplane cabins are conventionally lit by means of fluorescent tubes, the electrical actuation of which must satisfy the special requirements in the aeroplane for example in regard to freedom from electromagnetic interference, and thus to a certain degree is expensive and complicated.

2. Discussion of the Prior Art

Hitherto low-voltage incandescent lamps have been used for the emergency lighting in aeroplane cabins. Such incandescent lamps have to be replaced at regular intervals as they have only a very limited service life. In order to satisfy the specifications which apply in regard to aeroplane cabin design, concerning the radiation characteristic, those incandescent lamps are disposed in reflector housings of a special configuration, as is described for example in U.S. Pat. No. 4,158,223.

SUMMARY OF THE INVENTION

The object of the present invention is to provide a vehicle lighting arrangement which enjoys a long life and which is very substantially free from maintenance, which can be easily actuated and which nonetheless satisfies the required specifications.

In accordance with the invention that object is attained by a lighting arrangement which comprises a plurality of punctiform light sources, and wherein the punctiform light sources have at least one light emitting diode, and are at least partially connected to each other in parallel or in series relationship and are connected to at least one power supply unit. Developments and additional configurations of the invention are set forth in the detailed portion of the specification.

Hereinafter the invention is described in the form of a cabin lighting arrangement for aircraft. However the description—as regards inter alia in particular the properties and advantages according to the invention—equally well relates to lighting arrangements in road and rail vehicles, watercraft or other craft or vehicles.

The arrangement of a plurality of punctiform light sources, which are basically in the form of light spots or spotlights at or in the ceiling of the cabin of an aircraft, preferably an aeroplane, provides for uniform illumination of the cabin. The use of light emitting diodes (LEDs) in the punctiform light sources makes expensive electrical actuation of the cabin lighting arrangement redundant. In addition the power consumption drops considerably in comparison with the use of incandescent lamps. Thus, a simpler and smaller power supply can be used when employing lighting emitting diodes. Furthermore the service life of light emitting diodes is many times greater than that of fluorescent tubes and incandescent lamps so that there is no longer any need for the expensive operation of replacing defective lamps. Light emitting diodes can be produced with the most widely varying radiation characteristics, and for that reason the specifications which apply in regard to aircraft design, concerning the radiation characteristic of lamps, can be satisfied. In addition there are completely new options in regard to the design of the cabin lighting ("starry sky").

In a preferred embodiment, a respective Zener diode is connected in parallel in the reverse direction in relation to each light emitting diode or each group of light emitting diodes which are connected in parallel relationship with each other. A plurality of such light units are connected in series. If now one of the light emitting diodes or light emitting diode groups fails, a large part of the supply voltage is applied thereto and to the parallel-connected Zener diode, which has the result that the Zener diode breaks down. In that way the current can "flow past" the defective light emitting diode or light emitting diode group, and this ensures that, in the event of failure of a light emitting diode or a group of light emitting diodes, the entire run of light units which are connected in succession does not fail. The power supply unit is now preferably such that it always provides a constant current flow so that, in the event of failure of one or even several light units, the other light units are not supplied with an excessively high voltage.

Depending on the respective density of the punctiform light sources arranged at the ceiling of the aeroplane cabin, the lighting arrangement according to the invention can be used for illuminating the whole of the cabin, as reading lamps for the individual seat places, or as emergency lighting over the gangways between the rows of seats. Depending on the respectively desired design, it is possible to use various coloured light emitting diodes or preferably white light emitting diodes. The white light emitting diodes can comprise units formed from two or more coloured light emitting diodes or so-called luminescence conversion diodes.

BRIEF DESCRIPTION OF THE DRAWINGS

A preferred embodiment will be described in greater detail with reference to the drawings in which.

DETAILED DESCRIPTION OF PREFERRED EMBODIMENTS

Figure 1:
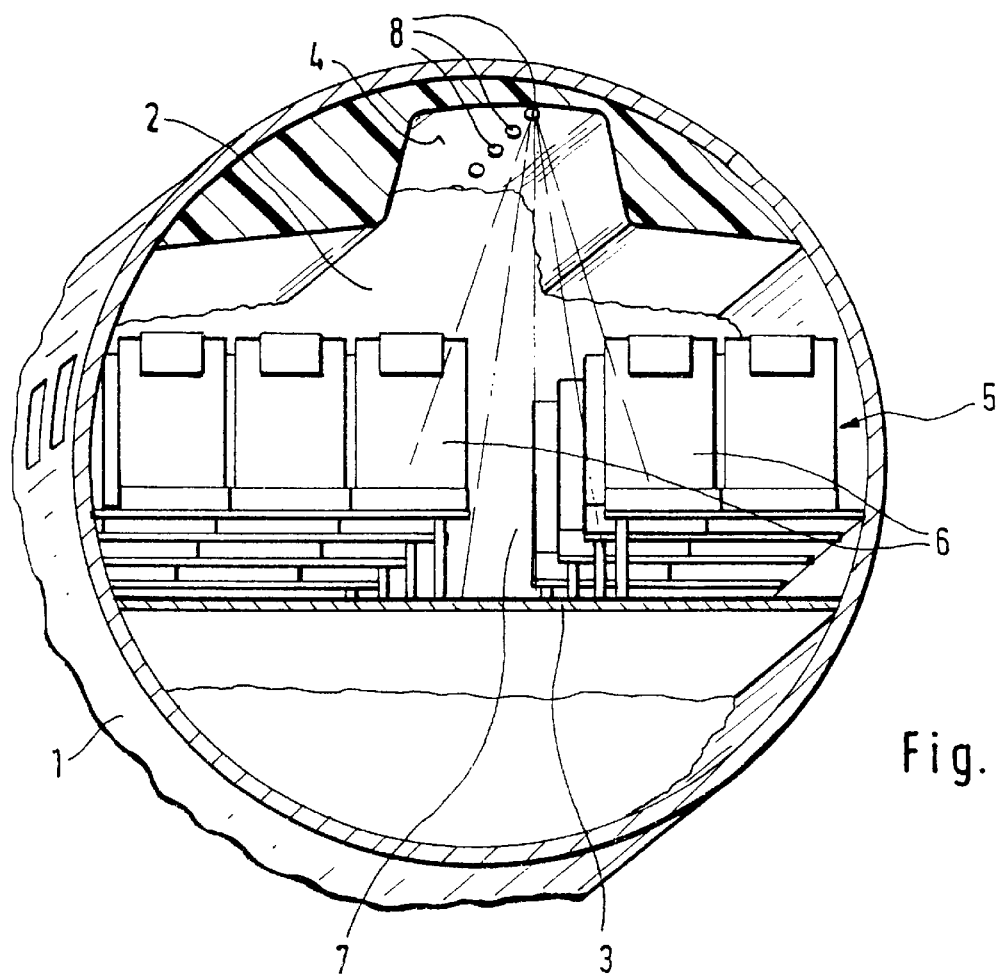
FIG. 1 is perspective view in cross-section through an aeroplane fuselage with a lighting arrangement according to the invention.

The aeroplane cabin 2 which is disposed in an aeroplane fuselage 1 is delimited at the bottom by a cabin floor 3 and at the top by a cabin ceiling 4. Standing on the cabin floor 3 are the seats 6 which are arranged in rows 5, separated by the gangway 7. Punctiform light sources 8 such as spotlights are disposed in the cabin ceiling 4. Depending on their respective brightness, radiation characteristic, their distribution in the cabin ceiling 4 and their density, that is to say their mutual spacing, the punctiform light sources 8 light up the whole of the aeroplane cabin or serve as emergency lighting for the gangway 7 between the rows of seats 5.

Figure 2:
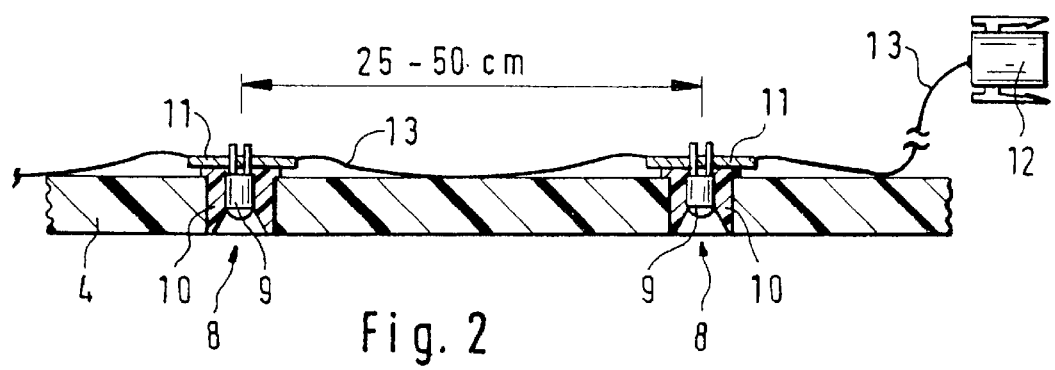
FIG. 2 is a view in section through the ceiling of an aeroplane cabin with light emitting diodes inserted therein as punctiform light sources.

The illustrated embodiment involves emergency lighting with punctiform light sources 8 arranged in a row, above the gangway 7. As can be seen from FIG. 2 the spacing between two punctiform light sources 8 is about 25 to 50 cm in each case. The punctiform light sources 8 which are fitted into the cabin ceiling 4 from above comprise light emitting diodes (LEDs) 9 which are each disposed in a respective housing 10. Each light emitting diode 9 is fixed with its housing 10 on a holding plate 11. By way of electrical connections (not shown) which are disposed on the fixing plates 11, the individual light emitting diodes 9 are connected together and to a respective plug 12 with a flexible electrically conducting cable 13.

Figure 3:
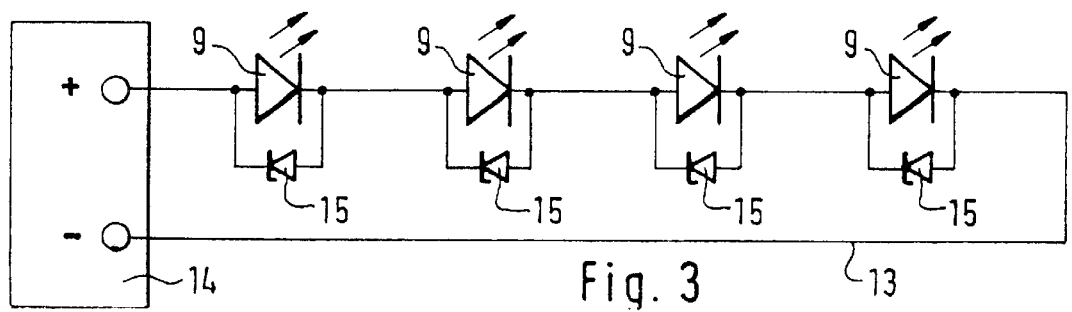
FIG. 3 shows a circuit diagram for the embodiment with light emitting diodes connected in succession.

The electrical circuitry of the light emitting diodes 9 is shown in FIG. 3. The light emitting diodes 9 are connected together in series and are connected by way of the cable 13 to an electrical power supply 14. A respective Zener diode 15 is connected in the reverse direction and in parallel relationship with each light emitting diode 9. In the event of failure of a light emitting diode 9 almost the entire voltage of the power source 14 is applied to the defective light emitting diode 9 and the Zener diode 15 which is connected in parallel therewith. The consequence of this is that the Zener diode 15 breaks down and the current can again flow therethrough. That means that the entire run of successively connected light emitting diodes does not fail when one light emitting diode is defective. The power supply 14 is preferably of such a design configuration that it supplies a constant current which can be for example 20 mA. That ensures that the individual light emitting diodes are not acted upon by an excessively high voltage and thus overloaded, even in the event of failure of one or more light emitting diodes and breakdown of the respective Zener diodes connected in-parallel therewith.

White light emitting diodes are preferably used as the light emitting diodes of the lighting arrangement. This may involve two (for example blue and yellow) or three (for example blue, green and red) light emitting diodes, which are combined together to give a ("white") light emitting diode. The arrangement however may also use so-called luminescence conversion diodes in which the light of diodes radiating blue or shorter-wave light is entirely or partially absorbed by luminescent materials and converted into longer wavelength ranges (for example green, yellow or red). By virtue of skilful superimposition of the various colours, the luminescence conversion diode, like also the light emitting diode comprising a plurality of coloured diodes, produces white or whitish light.

It should be pointed out that the aeroplane cabin lighting arrangement according to the invention is not limited to use as emergency lighting but that lighting of the entire aeroplane cabin can be envisaged when using sufficiently bright light emitting diodes, when the punctiform light sources are of suitable density or also when they are distributed over a surface over the cabin ceiling. It is also possible for the reading lamps which are disposed over the passenger seats to be afforded by means of light emitting diodes. and likewise the lighting in the cockpit or the freight compartment. As already mentioned the invention concerns not only the lighting of aircraft but equally the lighting of road or rail vehicles, watercraft or other craft or vehicles.

What is claimed is:

1. A lighting arrangement mounted at or in the ceiling of a vehicle, in particular a cabin overhead lighting arrangement in an aeroplane cabin, wherein the lighting arrangement comprises a plurality or spot light sources (8) each comprising at least one white light emitting diode (LED) (9), holders (10) each having respectively one said diode (LED) (9) fixed therein, said holders being introduced from above into bores located at or in said ceiling (4), said diodes being at least partially connected to each other in parallel or in series relationship and connected to at least one power supply unit (14).

2. A vehicle lighting arrangement according to claim 1 characterised in that a Zener diode (15) is connected in the reverse direction in parallel with each light emitting diode or light emitting diode group.

3. A vehicle lighting arrangement according to claim 1 or claim 2 characterised in that the power supply unit (14) is such that it provides for a constant current flow.

4. A vehicle lighting arrangement according to claim 1 characterised in that the lighting arrangement is disposed above the gangways (7) between the rows of seats (5) or above other gangways (7) and serves as emergency lighting.

5. A vehicle lighting arrangement according to claim 1 characterised in that the spotlight light sources (8) each comprise a respective light emitting diode (9), in relation to which a Zener diode (15) is connected in parallel in the reverse direction, and they are at least partially connected in series with each other and are connected to at least one power supply unit (14).

6. A vehicle lighting arrangement according to claim 5 characterised in that the spacing between adjacent light emitting diodes (9) is about between 25 and 50 cm.

7. A vehicle lighting arrangement according to claim 1 characterised in that the white light emitting diodes are formed from two or more coloured light emitting diodes.

8. A vehicle lighting arrangement according to claim 1 characterised in that the white light emitting diodes are luminescence conversion diodes.

* * * * *